United States Patent
Bolen et al.

(10) Patent No.: US 11,017,071 B2
(45) Date of Patent: May 25, 2021

(54) APPARATUS AND METHOD TO PROTECT AN INFORMATION HANDLING SYSTEM AGAINST OTHER DEVICES

(71) Applicant: DELL PRODUCTS, LP, Round Rock, TX (US)

(72) Inventors: Austin P. Bolen, Austin, TX (US); Mukund Pushottam Khatri, Austin, TX (US); Kevin T. Marks, Georgetown, TX (US); Manjunath Am, Chithradurga (IN)

(73) Assignee: Dell Products L.P., Round Rock, TX (US)

( * ) Notice: Subject to any disclaimer, the term of this patent is extended or adjusted under 35 U.S.C. 154(b) by 278 days.

(21) Appl. No.: 16/053,352

(22) Filed: Aug. 2, 2018

(65) Prior Publication Data
US 2020/0042692 A1 Feb. 6, 2020

(51) Int. Cl.
G06F 21/44 (2013.01)
G06F 13/42 (2006.01)

(52) U.S. Cl.
CPC .......... *G06F 21/44* (2013.01); *G06F 13/4282* (2013.01); *G06F 2213/0026* (2013.01)

(58) Field of Classification Search
CPC .............. G06F 21/44; G06F 13/4282; G06F 2213/0026; G06F 13/4295; G06F 21/606; G06F 15/177; G06F 13/4027; G06F 2213/0058
See application file for complete search history.

(56) References Cited

U.S. PATENT DOCUMENTS

| | | | | |
|---|---|---|---|---|
| 5,943,426 A * | 8/1999 | Frith | ................... | H04L 29/06 713/153 |
| 8,291,146 B2 * | 10/2012 | Luk | .................... | G06F 13/4282 710/313 |
| 8,423,690 B2 * | 4/2013 | Slaight | ................ | G06F 13/4022 710/74 |
| 8,782,317 B1 * | 7/2014 | Du | ........................... | G06F 9/44 710/311 |
| 8,930,609 B2 * | 1/2015 | Natu | ...................... | H04L 63/104 710/315 |
| 9,311,266 B2 * | 4/2016 | Jones | ................... | G06F 13/4027 |
| 9,940,143 B2 | 4/2018 | Kumar et al. | | |
| 2006/0288098 A1 * | 12/2006 | Singh | .................... | G06F 11/085 709/224 |
| 2009/0172240 A1 * | 7/2009 | Slaight | ................ | G06F 13/4022 710/313 |
| 2011/0246686 A1 * | 10/2011 | Cavanagh, Jr. | .......... | G06F 13/28 710/22 |
| 2015/0096051 A1 * | 4/2015 | Natu | ....................... | G06F 21/85 726/27 |
| 2015/0326437 A1 | 11/2015 | Shrestha et al. | | |

* cited by examiner

*Primary Examiner* — Abu S Sholeman
(74) *Attorney, Agent, or Firm* — Larson Newman, LLP

(57) ABSTRACT

An information handling system includes a processor, a peripheral component interconnect express (PCIe) endpoint, and a PCIe downstream port. The PCIe downstream port blocks PCIe vendor-defined messages (VDMs) from the PCIe endpoint as a default mode, changes to a second mode in response to the PCIe endpoint being verified, and allows PCIe VDMs from the PCIe endpoint while in the second mode.

17 Claims, 3 Drawing Sheets

APPARATUS AND METHOD TO PROTECT AN INFORMATION HANDLING SYSTEM AGAINST OTHER DEVICES

FIELD OF THE DISCLOSURE

The present disclosure generally relates to information handling systems, and more particularly relates to a security mechanism to protect an information handling system against other devices.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a processor, a peripheral component interconnect express (PCIe) endpoint, and a PCIe downstream port. The PCIe downstream port may block PCIe vendor-defined messages (VDMs) from the PCIe endpoint as a default mode, may change to a second mode in response to the PCIe endpoint being verified, and may allow PCIe VDMs from the PCIe endpoint while in the second mode.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
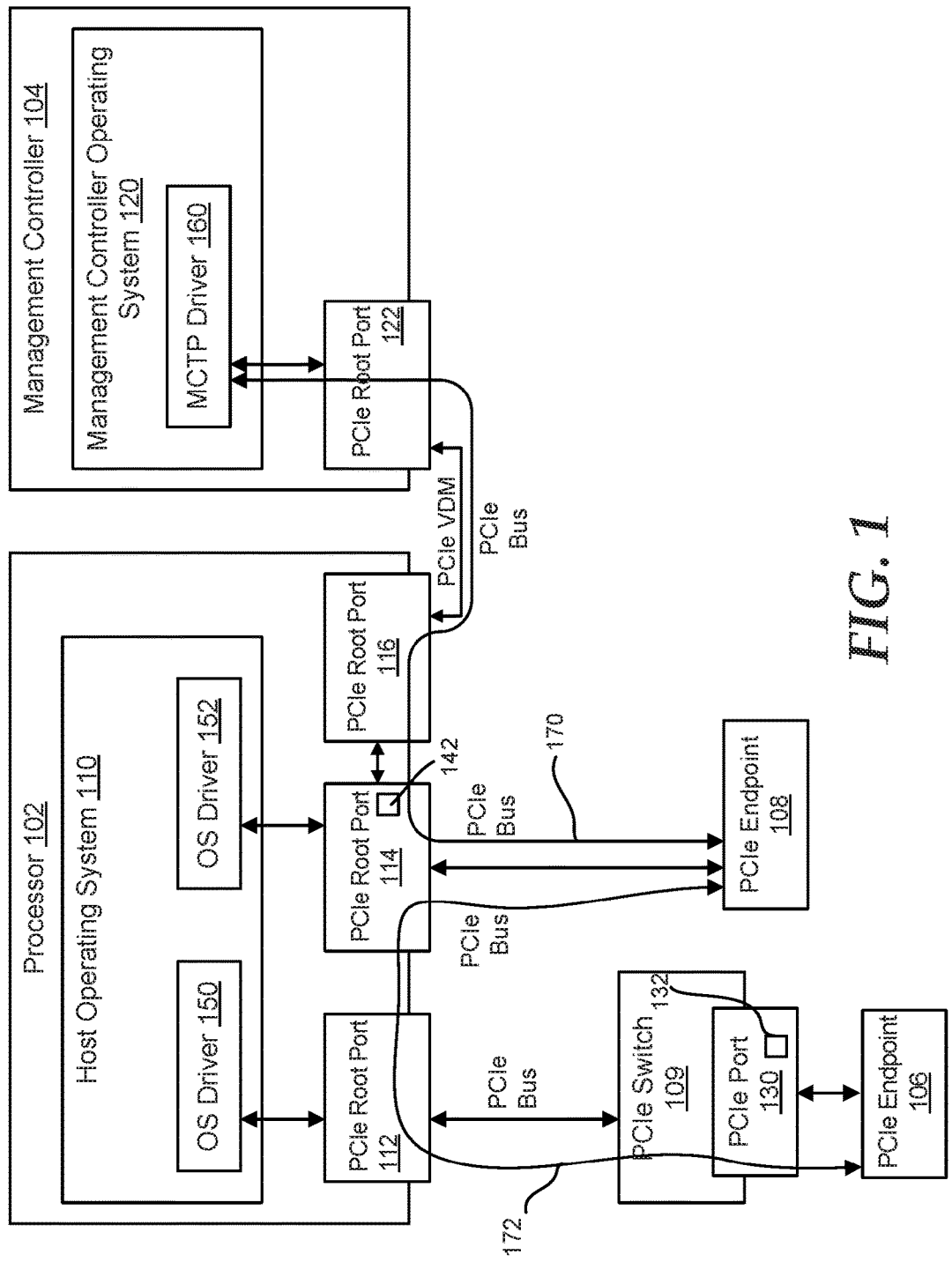
FIG. 1 is a block diagram of an information handling system according to at least one embodiment of the disclosure.

FIG. 1 illustrates an information handling system 100 according to at least one embodiment of the disclosure. The information handling system 100 includes a host processor 102, a management controller 104, Peripheral Component Interconnect Express (PCIe) endpoints 106 and 108, and a PCIe switch 109. The processor 102 includes a host operating system (OS) 110, and PCIe root ports 112, 114, and 116. One of ordinary skill in the art will recognize that while the processor 102 can include multiple additional components, for brevity and clarity only OS 110 and PCIe root ports 112, 114, and 116 have been shown and discussed herein. The management controller 104 includes a management controller OS 120. In an embodiment, the management controller 104 is a PCIe endpoint able to communicate with the processor 102. One of ordinary skill in the art will recognize that while the management controller 104 can include multiple additional components, for brevity and clarity only management controller OS 120 has been shown and discussed herein. The information handling system 100 can include additional endpoints and processors without varying from the scope of the current disclosure.

In an embodiment, the OS 110 can implement OS drivers 150 and 152 to enable communication with other components, such as PCIe endpoints 106 and 108 and management controller 104, via the PCIe root ports 112, 114, and 116. Similarly, the OS 120 of the management controller 104 can implement a Management Component Transport Protocol (MCTP) driver 160 to enable communication with other components, such as the processor 102 and the PCIe endpoints 106 and 108. In an embodiment, the PCIe endpoint 106 may communicate with the processor 102 via a PCIe bus between the endpoint 106 and the PCIe root port 112 of the processor 102. Similarly, the PCIe endpoint 108 may communicate with the processor 102 via a PCIe bus between the PCIe root port 114 and the PCIe switch 109, and via a PCIe bus between the PCIe endpoint 106 and the PCIe port 130 of the PCIe switch 109. PCIe out-of-band communications in the information handling system 100 can be managed using one or both of two possible physical layers: system management bus (SMBus) and PCIe. However, only PCIe communications will be discussed herein.

In an embodiment, PCIe Vendor-Defined-Messages (VDM) technology can be utilized by the management controller 104 to use MCTP over PCIe VDM to transport network pass-through packets to any port, such as root ports 112, 114, and 116 or PCIe port 130, on the PCIe bus, thus eliminating the need for complex wiring and providing shared network connectivity on any endpoint. For example, when the endpoint 108 is connected to the processor 102 of the information handling system 100, the MCTP driver 160 can communicate with the endpoint 108 via a MCTP communication, represented by line 170, over the PCIe VDM path of the PCIe buses in the information handling system 100. Additionally, the PCIe endpoints 106 and 108 can send peer-to-peer PCIe VDM communications, represented by line 172, between each other. These PCIe VDM communications are out-of-band communications that may be used to configure a PCIe endpoint, configure a memory, perform read/write operations, or the like. However, there is a risk that an unknown PCIe device, such as PCIe endpoint 106, can be connected to the information handling system 100 and can utilize PCIe VDM communications to perform malicious operations on another device, such as PCIe endpoint 108. Thus, the information handling system 100 disclosed herein includes an improvement in the PCIe port 130 and the PCIe root port 114 to prevent a rogue PCIe endpoint from compromising other devices in the information handling system 100. In an embodiment, the PCIe port 130 and PCIe root port 114 can be considered downstream ports, which is a last port that data from the processor 102 enters before reaching a desired endpoint.

The PCIe port 130 of PCIe switch 109 can include a configuration bit 132 that can be utilized to control whether PCIe VDM communications are allowed by the PCIe endpoint 106. Similarly, when no PCIe switch exists between the PCIe root port and the PCIe endpoint, such as PCIe root port 114 and PCIe endpoint 108, the PCIe root port 114 can include a configuration bit 142 that can be utilized to control whether PCIe VDM communications are allowed by the PCIe endpoint 108. While the operation of the configuration bits 132 and 142 can be substantially the same, for clarity and brevity the discussion of the configuration bit will be only with respect to configuration bit 132.

In an embodiment, the configuration bit 132 can be a mode select bit for the PCIe port 130. In this embodiment, PCIe VDMs from the PCIe endpoint 106 are blocked when the configuration bit 132 has a first value, and PCIe VDMs from the PCIe endpoint 106 are allowed when the configuration bit 132 has a second value. In an embodiment, the default configuration of the information handling system 100, is that all downstream ports, such as PCIe port 130 of PCIe switch 109, default to block PCIe VDMs from the endpoints, such as PCIe endpoint 106, connected to the downstream port. Similarly, the default configuration of the information handling system 100, is that all PCIe root ports, such as PCIe root port 114, default to block PCIe VDMs from the endpoints, such as PCIe endpoint 108, connected to the PCIe root port. Thus, configuration bit 132 can have a default setting with the first value being stored in the configuration bit 132, such that PCIe VDMs from the PCIe endpoint 106 are blocked when the PCIe endpoint 106 is first connected to the information handling system 100.

In the default state of configuration bit 132, the OS 110 can detect PCIe endpoint 106 and can send communications to the PCIe endpoint 106, via PCIe switch 109, even though endpoint 106 cannot send PCIe VDMs. In this situation, the OS 110, via OS driver 150, can communicate with PCIe endpoint 106 through the PCIe root port 112 and PCIe downstream port 130 of PCIe switch 109 to verify the endpoint 106 so that the PCIe VDM block may be removed. In an embodiment, the OS driver 150 can provide an in-band communication to the endpoint 106 to verify a digital signature of option read only memory (ROM) within the endpoint 106. In an embodiment, the verification of the digital signature can be performed using private and public keys in the basis input/output system (BIOS) of the processor 102 and the BIOS of the endpoint 106. If the digital signature of the endpoint 106 is not verified, the processor 102 can determine that the endpoint 106 is corrupted and therefore the processor 102 would not change the state of the configuration bit 132. However, if the digital signature for the endpoint 106 is verified, the processor can change the configuration bit 132 to have the second value and thereby allow PCIe VDMs from the PCIe endpoint 106 to other components. For example, PCIe endpoint 106 can send a PCIe VDM, represented by line 172, to the PCIe endpoint 108.

In an embodiment, the security of the components within the information handling system 100 can be increased by only allowing upstream device, such as processor 102 or management controller 104, to change the configuration bit 132 of PCIe port 130. If endpoint 106 is removed from the information handling system 100 after the endpoint 106 has been verified, the processor 102 or management controller 104 can reset the configuration bit 132 to have the first value and thereby block PCIe VDMs from any endpoint connected to PCIe port 130 until that endpoint has been verified as discussed above. While blocking PCIe VDM communications from the endpoint 106 until the endpoint 106 is verify is disclosed herein with respect to the configuration bit 132, blocking can be performed in any other manner, such as using whitelist and blacklists of endpoints in the PCIe port 130, without varying from the scope of this disclosure. In this embodiment, the processor 102 or management controller 104 can maintain the whitelists and blacklists to control the endpoints enabled to send PCIe VDMs.

Figure 2:
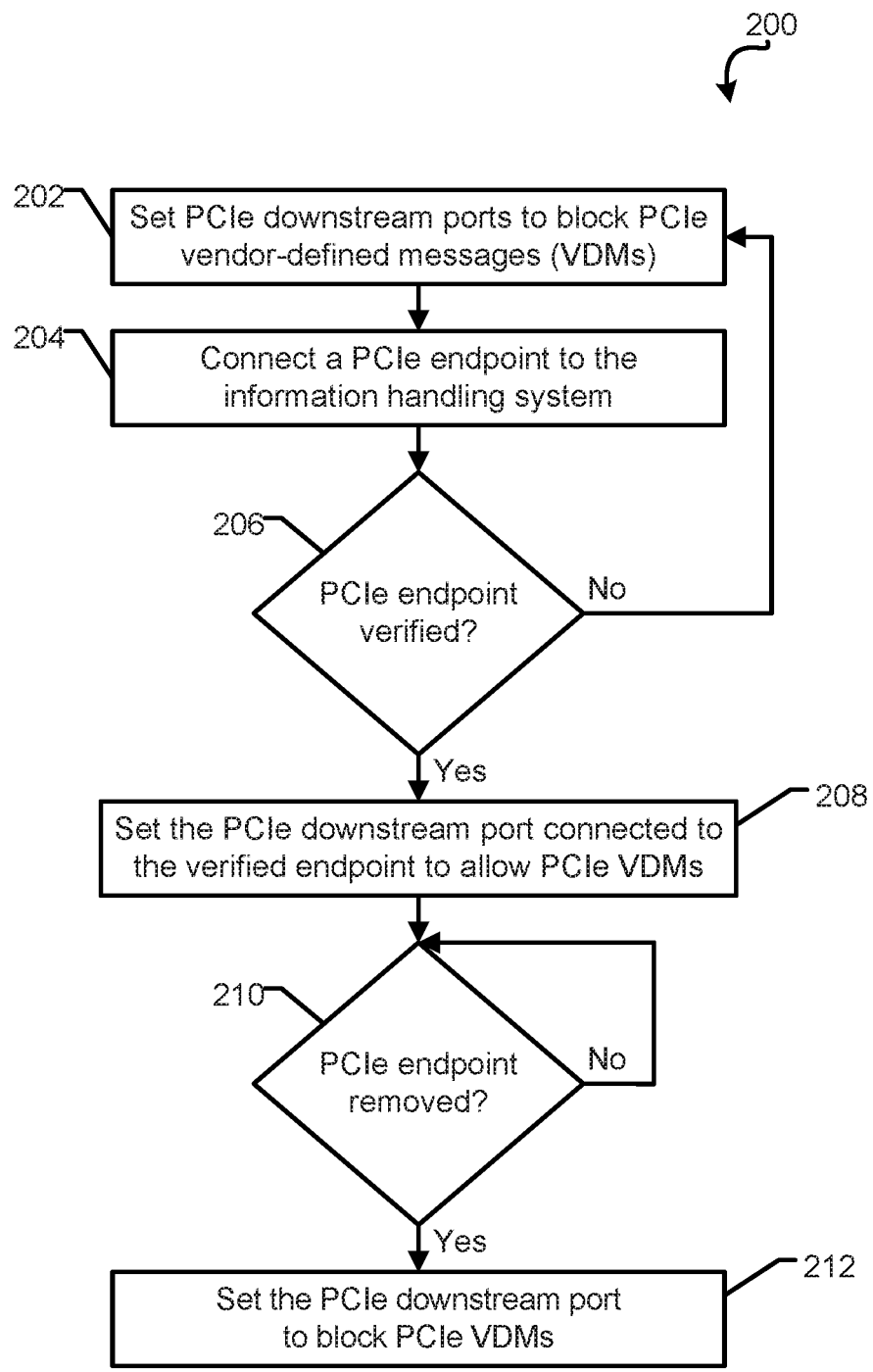
FIG. 2 is a flow diagram of a method for preventing an endpoint from compromising another endpoint in the information handling system according to at least one embodiment of the present disclosure.

FIG. 2 illustrates a method 200 for preventing an endpoint from compromising another endpoint in the information handling system according to at least one embodiment of the present disclosure. At block 202, PCIe downstream ports of an information handling system are set to block PCIe VDMs from newly connected endpoints. In an embodiment, PCIe root ports of an information handling system, without additional PCIe downstream ports between the PCIe root port and the PCIe endpoint, can be considered PCIe downstream ports, such that these PCIe root ports are also set to block PCIe VDMs from newly connected endpoints. In an embodiment, setting a mode of the PCIe downstream port to block PCIe VDMs can be a default mode in the information handling system. A new PCIe endpoint is connected to the information handling system at block 204. At block 206, a determination is made whether the new PCIe endpoint is verified. In an embodiment, the new PCIe endpoint can be verified based on a verification of a digital signature of the PCIe endpoint.

If the PCIe endpoint is verified, the PCIe downstream port, or PCIe root port as a PCIe downstream port, connected to the PCIe endpoint is changed to allow the PCIe endpoint to send PCIe VDMs to other devices in the information handling system at block 208. Otherwise, if the PCIe endpoint is not verified, flow continues as stated above at block 202 and the PCIe downstream port, or PCIe root port as a PCIe downstream port, continues to block PCIe VDMs. At block 210, a determination is made whether the PCIe endpoint is removed from the information handling system. When the PCIe endpoint is removed, the PCIe downstream port, or PCIe root port as a PCIe downstream port, is set to block PCIe VDMs at block 212.

Figure 3:
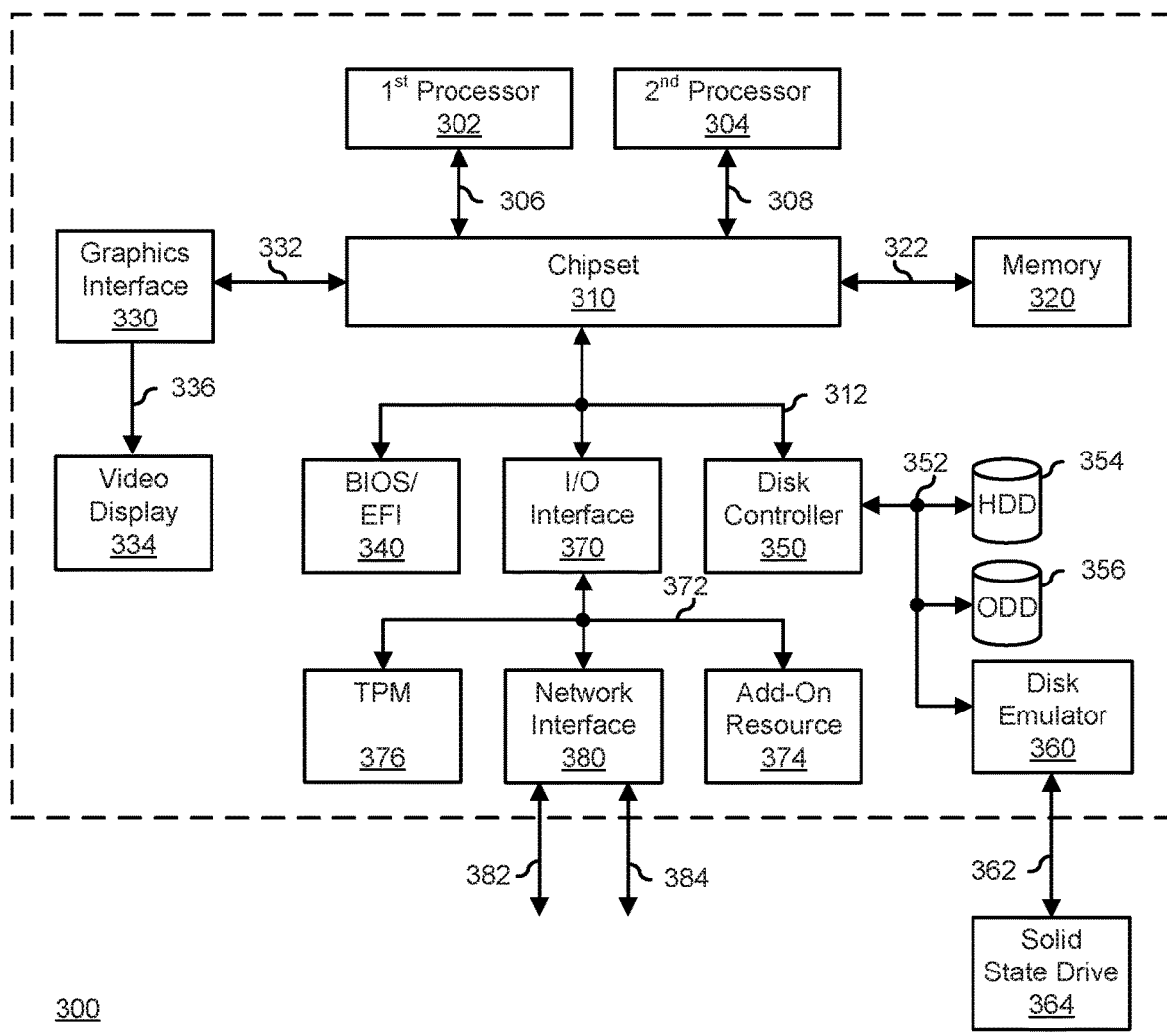
FIG. 3 is a block diagram of a general information handling system according to at least one embodiment of the disclosure.

FIG. 3 illustrates a generalized embodiment of information handling system 300, such as information handling system 100 of FIG. 1. For purpose of this disclosure information handling system 300 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described above, and operates to perform one or more of the methods described above. Information handling system 300 includes a processors 302 and 304, a chipset 310, a memory 320, a graphics interface 330, include a basic input and output system/extensible firmware interface (BIOS/EFI) module 340, a disk controller 350, a disk emulator 360, an input/output (I/O) interface 370, and a network interface 380. Processor 302 is connected to chipset 310 via processor interface 306, and processor 304 is connected to the chipset via processor interface 308. Memory 320 is connected to chipset 310 via a memory bus 322. Graphics interface 330 is connected to chipset 310 via a graphics interface 332, and provides a video display output 336 to a video display 334. In a particular embodiment, information handling system 300 includes separate memories that are dedicated to each of processors 302 and 304 via separate memory interfaces. An example of memory 320 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 340, disk controller 350, and I/O interface 370 are connected to chipset 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 310 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 340 includes BIOS/EFI code operable to detect resources within information handling system 300, to provide drivers for the resources, initialize the resources, and access the resources. BIOS/EFI module 340 includes code that operates to detect resources within information handling system 300, to provide drivers for the resources, to initialize the resources, and to access the resources.

Disk controller 350 includes a disk interface 352 that connects the disc controller to a hard disk drive (HDD) 354, to an optical disk drive (ODD) 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits a solid-state drive 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O interface 370 includes a peripheral interface 372 that connects the I/O interface to an add-on resource 374, to a TPM 376, and to network interface 380. Peripheral interface 372 can be the same type of interface as I/O channel 312, or can be a different type of interface. As such, I/O interface 370 extends the capacity of I/O channel 312 when peripheral interface 372 and the I/O channel are of the same type, and the I/O interface translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as chipset 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
   a memory to store a set of instructions;
   a processor to execute the set of instructions;
   a peripheral component interconnect express (PCIe) endpoint to communicate with the processor; and
   a PCIe downstream port coupled between the processor and the PCIe endpoint, the PCIe downstream port set to block PCIe vendor-defined messages (VDMs) from the PCIe endpoint as a default mode, wherein a VDM communication is used to configure one or more components within the information handling system, to change to a second mode in response to the PCIe endpoint being verified, and to allow PCIe VDMs from the PCIe endpoint while in the second mode,
   while the PCIe downstream port is in the default mode, the processor to execute the instructions in the memory to detect the PCIe endpoint, to communicate with the PCIe via the PCIe downstream port to verify the PCIe endpoint, wherein the processor communicates with the PCIe endpoint without the PCIe endpoint being able to send PCIe VDMs.

2. The information handling system of claim 1, wherein the PCIe downstream port is changed to the default mode in response to the PCIe endpoint being removed from the information handling system.

3. The information handling system of claim 1, wherein the PCIe downstream port is in the default mode in response to a first value being stored in a configuration bit of the PCIe downstream port.

4. The information handling system of claim 3, wherein the PCIe downstream port is in the second mode in response to a second value being stored in the configuration bit of the PCIe downstream port.

5. The information handling system of claim 1, wherein the PCIe VDMs are peer-to-peer signals sent from the first PCIe endpoint to another PCIe endpoint of the information handling system.

6. The information handling system of claim 1, wherein the PCIe endpoint is verified in response to a digital signature of the PCIe endpoint being verified.

7. A method comprising:
   setting a peripheral component interconnect express (PCIe) downstream port of an information handling system to block PCIe vendor-defined messages (VDMs) from a PCIe endpoint connected to the PCIe downstream port, wherein a VDM communication is used to configure one or more components within the information handling system;
   detecting, by a processor of the information handling system, the PCIe endpoint;
   communicating, by the processor, with the PCIe via the PCIe downstream port to verify the PCIe endpoint, wherein the processor communicates with the PCIe endpoint while the PCIe endpoint is blocked from sending PCIe VDMs;
   determining whether the PCIe endpoint is verified by the information handling system; and
   setting the PCIe downstream port to allow PCIe VDMs from the verified PCIe endpoint.

8. The method of claim 7, further comprising:
   setting the PCIe downstream port to block PCIe VDMs in response to the verified PCIe endpoint being removed from the information handling system.

9. The method of claim 7, setting the PCIe downstream port to block PCIe VDMs comprises:
   storing a first value in a configuration bit of the PCIe downstream port.

10. The method of claim 9, setting the PCIe downstream port to allow PCIe VDMs comprises:
    storing a second value in the configuration bit of the PCIe downstream port.

11. The method of claim 7, wherein the PCIe VDMs are peer-to-peer signals sent from the first PCIe endpoint to another PCIe endpoint of the information handling system.

12. The method of claim 7, wherein verifying the PCIe endpoint comprises:
    verifying a digital signature of the PCIe endpoint.

13. An information handling system comprising:
    a memory to store a set of instructions;
    a processor to execute the set of instructions;
    first and second peripheral component interconnect express (PCIe) endpoints to communicate with the processor;
    a first PCIe downstream port coupled between the processor and the first PCIe endpoint, the PCIe downstream port set to block PCIe vendor-defined messages (VDMs) from the first PCIe endpoint as a default mode, wherein a VDM communication is used to configure one or more components within the information handling system; and
    a second PCIe downstream port coupled between the processor and the second PCIe endpoint, the second PCIe downstream port to block PCIe VDMs from the second PCIe endpoint as the default mode, to change to a second mode in response to the second PCIe endpoint being verified, and to allow a PCIe VDM from the second PCIe endpoint to the first PCIe endpoint while in the second mode, while the second PCIe downstream port is in the default mode, the processor to execute the instructions in the memory to detect the second PCIe endpoint, to communicate with the second PCIe via the second PCIe downstream port to verify the second PCIe endpoint, wherein the processor communicates with the second PCIe endpoint without the second PCIe endpoint being able to send PCIe VDMs.

14. The information handling system of claim 13, wherein the second PCIe downstream port is changed to the default mode in response to the second PCIe endpoint being removed from the information handling system.

15. The information handling system of claim 13, wherein the second PCIe downstream port is in the default mode in response to a first value being stored in a configuration bit of the second PCIe downstream port.

16. The information handling system of claim 15, wherein the second PCIe downstream port is in the second mode in response to a second value being stored in the configuration bit of the second PCIe downstream port.

17. The information handling system of claim 13, wherein the PCIe VDMs are peer-to-peer signals sent between the first and second PCIe endpoints.

* * * * *